US012579375B2

(12) United States Patent
Ein-Dor et al.

(10) Patent No.: US 12,579,375 B2
(45) Date of Patent: Mar. 17, 2026

(54) IMPLEMENTING ACTIVE LEARNING IN NATURAL LANGUAGE GENERATION TASKS

(71) Applicant: International Business Machines Corporation, Armonk, NY (US)

(72) Inventors: Liat Ein-Dor, Tel Aviv (IL); Yotam Perlitz, Givatayim (IL); Michal Shmueli-Scheuer, Tel Aviv (IL); Dafna Sheinwald, Haifa (IL); Ariel Gera, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 18/378,249

(22) Filed: Oct. 10, 2023

(65) Prior Publication Data

US 2025/0117592 A1       Apr. 10, 2025

(51) Int. Cl.
*G06F 40/40*          (2020.01)
*G06N 20/00*          (2019.01)

(52) U.S. Cl.
CPC ............. *G06F 40/40* (2020.01); *G06N 20/00* (2019.01)

(58) Field of Classification Search
CPC ................................ G06F 40/40; G06N 20/00
See application file for complete search history.

(56) References Cited

U.S. PATENT DOCUMENTS 10,977,518 B1 *   4/2021   Sharma ................. G06V 10/774
11,048,979 B1 *   6/2021   Zhdanov ............. G06F 18/2155

2004/0111253 A1    6/2004   Luo et al.
2018/0240031 A1 *  8/2018   Huszar ................... G06N 3/045
2023/0177115 A1 *  6/2023   Tommasi ............ G06F 18/2155
                                                              706/15

FOREIGN PATENT DOCUMENTS

CN          108805258 A  * 11/2018   ........... G06V 10/774

OTHER PUBLICATIONS

Dong et al., "A Survey of Natural Language Generation", Dec. 2022 (Year: 2022).*

(Continued)

*Primary Examiner* — Richemond Dorvil
*Assistant Examiner* — Adam Michael Weaver
(74) *Attorney, Agent, or Firm* — Ryan, Mason & Lewis, LLP

(57)                 ABSTRACT

Methods, systems, and computer program products for implementing active learning in NLG tasks are provided herein. A computer-implemented method includes generating multiple natural language annotations associated with multiple items of unlabeled data by processing the unlabeled data using at least one artificial intelligence model; determining at least one quality score attributed to at least a portion of the multiple generated natural language annotations based at least in part on at least one quality metric; selecting at least one of the multiple natural language annotations and at least one corresponding item of the multiple items of unlabeled data based at least in part on the at least one determined quality score; and performing one or more automated actions based at least in part on the at least one selected natural language annotation.

20 Claims, 4 Drawing Sheets

(56) References Cited

OTHER PUBLICATIONS

Mohankumar et al., Active Evaluation: Efficient NLG Evaluation with Few Pairwise Comparisons, Annual Meeting of the Association for Computational Linguistics, Published Date: Mar. 11, 2022.

Perlitz et al., Active Learning for Natural Language Generation, Published Date: Jul. 7, 2021.

Dušek et al., Training a Natural Language Generator From Unaligned Data, Proceedings of the 53rd Annual Meeting of the Association for Computational Linguistics, Published Date: Jul. 31, 2015.

Mairesse et al., Phrase-based Statistical Language Generation using Graphical Models and Active Learning, Proceedings of the 48th Annual Meeting of the Association for Computational Linguistics, Published Date: Jul. 16, 2010.

Chang et al., On Training Instance Selection for Few-Shot Neural Text Generation, Proceedings of the 59th Annual Meeting of the Association for Computational Linguistics, Published Date: Jul. 7, 2021.

Gidiotis et al., Should We Trust This Summary? Bayesian Abstractive Summarization to the Rescue. Findings of the Association for Computational Linguistics: ACL 2022.

Tsvigun et al., Active Learning for Abstractive Text Summarization, Findings of the Association for Computational Linguistics: EMNLP 2022.

Gao et al., APRIL: Interactively Learning to Summarise by Combining Active Preference Learning and Reinforcement Learning. Proceedings of the 2018 Conference on Empirical Methods in Natural Language Processing.

Zhao et al., Active Learning Approaches to Enhancing Neural Machine Translation, Findings of the Association for Computational Linguistics: EMNLP 2020.

Karaoguz, E., Adaptive Learning Strategies for Neural Paraphrase Generation, Universitat Hamburg, 2018.

* cited by examiner

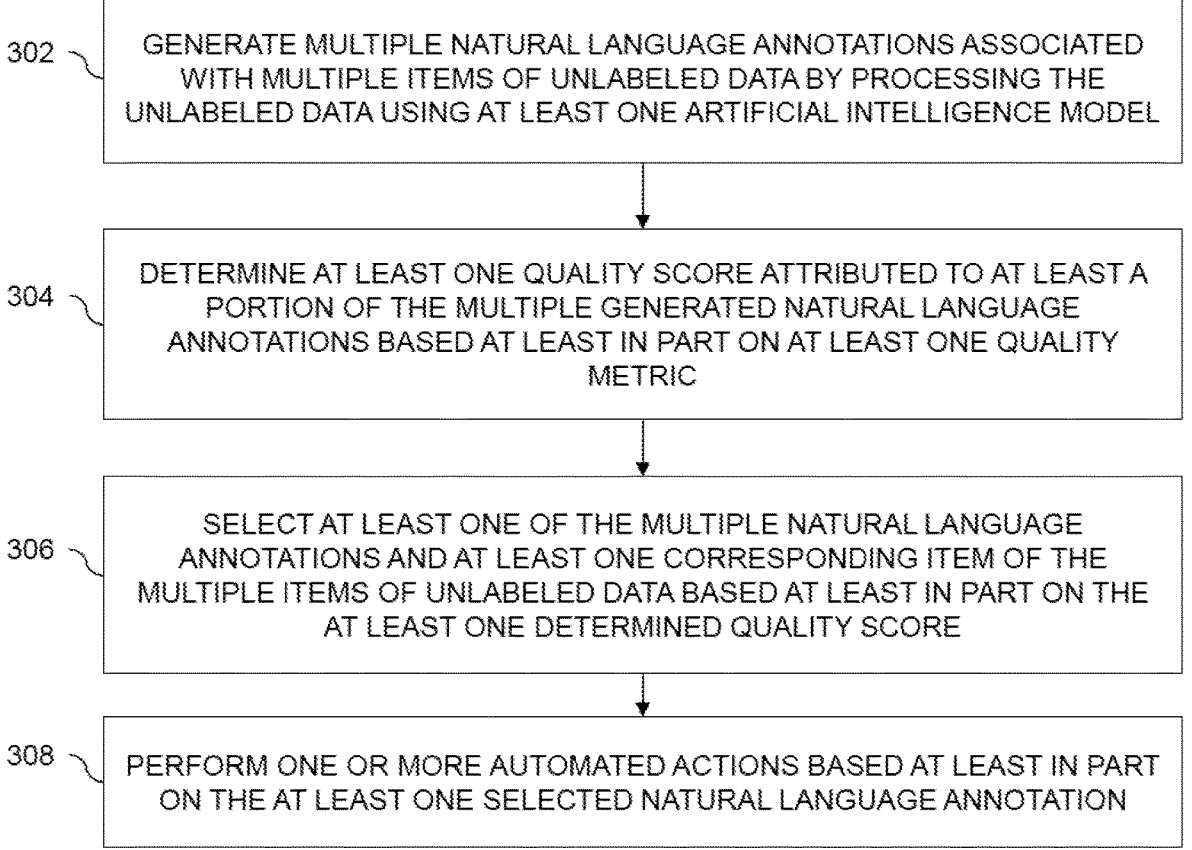

302 — GENERATE MULTIPLE NATURAL LANGUAGE ANNOTATIONS ASSOCIATED WITH MULTIPLE ITEMS OF UNLABELED DATA BY PROCESSING THE UNLABELED DATA USING AT LEAST ONE ARTIFICIAL INTELLIGENCE MODEL

304 — DETERMINE AT LEAST ONE QUALITY SCORE ATTRIBUTED TO AT LEAST A PORTION OF THE MULTIPLE GENERATED NATURAL LANGUAGE ANNOTATIONS BASED AT LEAST IN PART ON AT LEAST ONE QUALITY METRIC

306 — SELECT AT LEAST ONE OF THE MULTIPLE NATURAL LANGUAGE ANNOTATIONS AND AT LEAST ONE CORRESPONDING ITEM OF THE MULTIPLE ITEMS OF UNLABELED DATA BASED AT LEAST IN PART ON THE AT LEAST ONE DETERMINED QUALITY SCORE

308 — PERFORM ONE OR MORE AUTOMATED ACTIONS BASED AT LEAST IN PART ON THE AT LEAST ONE SELECTED NATURAL LANGUAGE ANNOTATION

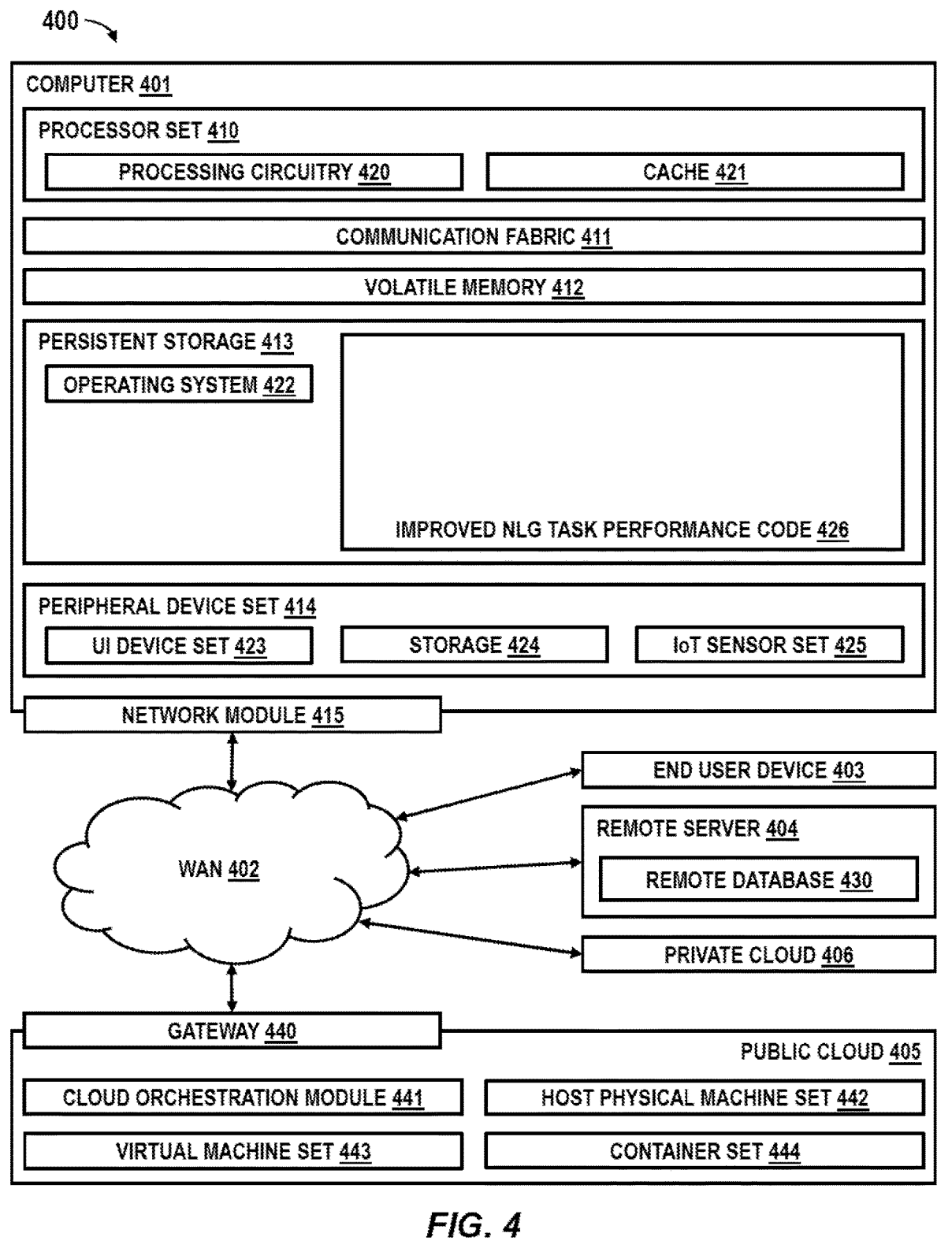

COMPUTER 401

PROCESSOR SET 410

| PROCESSING CIRCUITRY 420 | CACHE 421 |

COMMUNICATION FABRIC 411

VOLATILE MEMORY 412

PERSISTENT STORAGE 413

OPERATING SYSTEM 422

IMPROVED NLG TASK PERFORMANCE CODE 426

PERIPHERAL DEVICE SET 414

| UI DEVICE SET 423 | STORAGE 424 | IoT SENSOR SET 425 |

NETWORK MODULE 415

WAN 402

END USER DEVICE 403

REMOTE SERVER 404

REMOTE DATABASE 430

PRIVATE CLOUD 406

GATEWAY 440

PUBLIC CLOUD 405

| CLOUD ORCHESTRATION MODULE 441 | HOST PHYSICAL MACHINE SET 442 |
| VIRTUAL MACHINE SET 443 | CONTAINER SET 444 |

*FIG. 4*

IMPLEMENTING ACTIVE LEARNING IN NATURAL LANGUAGE GENERATION TASKS

BACKGROUND

The present application generally relates to information technology and, more particularly, to language processing. More specifically, a challenge in processing natural text generation tasks includes shortages of annotated data. Conventional language processing techniques typically include obtaining human annotation for training models on text generation tasks. However, such techniques are resource-intensive, time-consuming, and error-prone.

SUMMARY

In at least one embodiment, techniques for implementing active learning in natural language generation (NLG) tasks are provided.

An example computer-implemented method includes generating multiple natural language annotations associated with multiple items of unlabeled data by processing the unlabeled data using at least one artificial intelligence model. The method also includes determining at least one quality score attributed to at least a portion of the multiple generated natural language annotations based at least in part on at least one quality metric. Further, the method includes selecting at least one of the multiple natural language annotations and at least one corresponding item of the multiple items of unlabeled data based at least in part on the at least one determined quality score. Additionally, the method also includes performing one or more automated actions based at least in part on the at least one selected natural language annotation.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a flow diagram illustrating techniques according to an example embodiment of the invention; and FIG. 4 is a diagram illustrating a computing environment in which at least one embodiment of the invention can be implemented.

DETAILED DESCRIPTION

Figure 1:
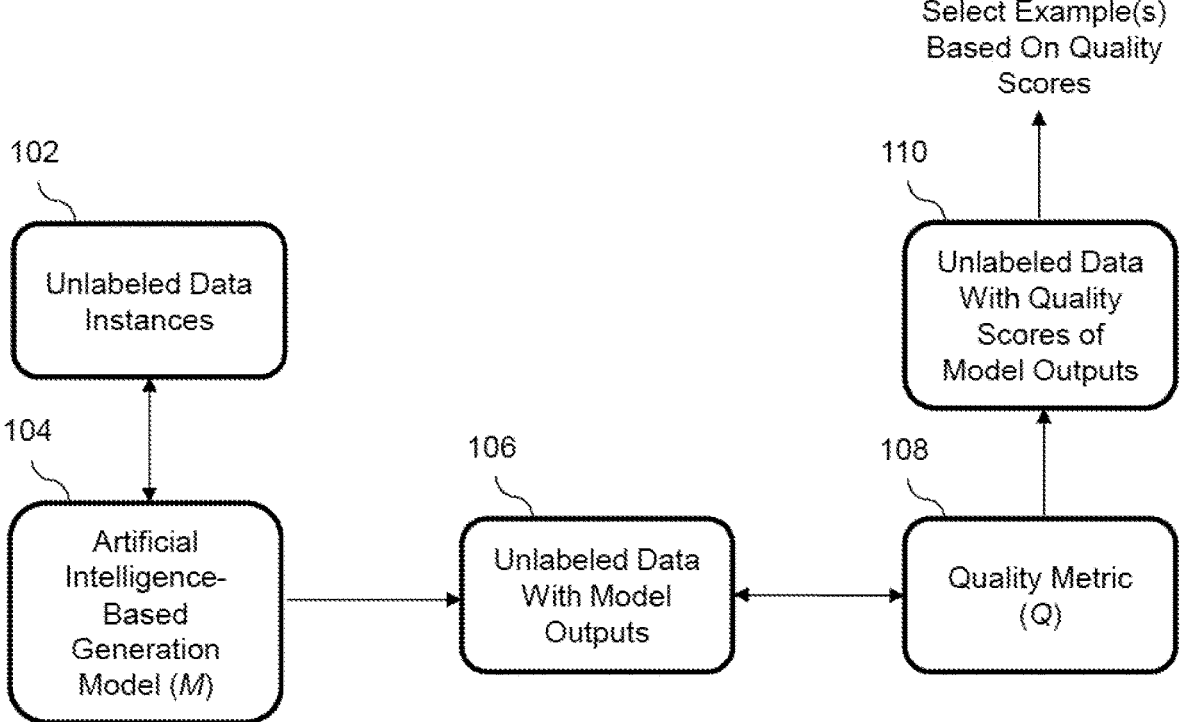
FIG. 1 is a diagram illustrating an example workflow for implementing active learning in an NLG task, according to an example embodiment of the invention.

As described herein, at least one embodiment includes implementing active learning in NLG tasks. Such an embodiment can include generating and/or implementing at least one task-specific quality-based strategy for active learning in NLG tasks. As used herein, active learning includes a machine learning approach for reducing annotation effort by selecting informative examples for annotation.

Accordingly, one or more embodiments include determining and/or generating one or more active learning strategies that are tailored to one or more characteristics of one or more particular NLG tasks. As further detailed herein, such active learning strategies are implemented to select a subset of unlabeled data examples. Additionally, at least one embodiment includes leveraging one or more metrics (e.g., one or more reference-less evaluation metrics, wherein reference-less evaluation metrics refer to metrics that lack any human-generated comparison point) for measuring the quality of the generated outputs of the one or more particular NLG tasks using the one or more active learning strategies.

Additionally, such an embodiment includes identifying at least a portion of the one or more metrics, also referred to herein as a quality metric (Q), and selecting one or more examples of unlabeled data whose annotation will yield improvement (e.g., the maximal improvement) in the quality of the artificial intelligence model output (i.e., output of the artificial intelligence model used in carrying out the given NLG task), as measured by Q. Accordingly, in such an embodiment, active learning strategies select which unlabeled data should be labeled and/or annotated, and then those chosen items of data will be used to train the artificial intelligence model.

Further, in one or more embodiments, such examples of unlabeled data can be selected, for example, based at least in part on difference between the expected quality of manual annotation and the quality of the artificial intelligence model-generated output (e.g., informative examples can include those with higher differences between the expected quality of manual annotation and the artificial intelligence model-generated output). As further detailed herein, determining the expected quality of manual annotation can be carried out by training a quality regression model using core labeled data examples of human-labeled data.

Accordingly, at least one embodiment includes implementing, in connection with at least one NLG task, one or more active learning techniques and/or strategies that leverage one or more reference-less evaluation metrics. Such an embodiment includes using at least one artificial intelligence-based natural language generation model (for example, one or more transformer-based generative models such as one or more encoder-decoder models (e.g., T5, Pegasus, etc.), one or more denoising autoencoders (e.g., a bidirectional and auto-regressive transformer (BART)), etc.), at least one reference-less evaluation metric which does not rely on human-reference text, and at least one set of unlabeled data. In such an embodiment, for each example in the unlabeled data, the at least one artificial intelligence-based natural language generation model generates an output (e.g., task-specific text, which can include, for example, a summary of input text, an annotation of input text, etc.), and the at least one reference-less evaluation metric is used to measure the quality of the model output.

Further, in connection with such an embodiment, unlabeled data examples with the lowest values (relative to the other unlabeled data examples), as measured by the at least one reference-less evaluation metric, can be considered the hardest (i.e., the most difficult for the model process) and can be selected for labeling. Additionally or alternatively, given a quality estimator that predicts the quality of human annotation of data, one or more active learning techniques and/or strategies can be implemented to select the examples of unlabeled data with the largest predicted difference between the quality of human annotation and the current model output. Such labels can then be added to a related set of labeled data and used to train and/or tune the at least one artificial intelligence-based natural language generation model and/or train at least one separate artificial intelligence-based natural language generation model. Also, such a process as detailed above can be automatically repeated, in one or more embodiments, iteratively until at least one stopping criterion (e.g., a maximum number of data examples) is reached, as determined by at least one user.

As detailed herein, at least one embodiment includes generating and/or implementing one or more active learning techniques and/or strategies that are tailored to one or more characteristics of one or more NLG tasks. Such active learning techniques and/or strategies leverage one or more reference-less evaluation metrics for measuring the quality of model-generated outputs. Additionally, active learning techniques and/or strategies incorporate and/or utilize a quality score function, Q, which can include one of the reference-less evaluation metrics or can include a combination of multiple of the reference-less evaluation metrics (e.g., the geometric average of multiple reference-less evaluation metrics).

Also, for each example, S, in a set of unlabeled data used in connection with a given NLG task, the given artificial intelligence model (e.g., an artificial intelligence-based natural language generation model being used in performing the given NLG task) generates an output S', and Q is then applied to the data pair (S, S') and a corresponding Q value is calculated and/or determined. In at least one embodiment, examples with the lowest Q values are selected for labeling and subsequently used in training the given artificial intelligence model.

At least one embodiment of the present invention may provide a beneficial effect such as, for example, reducing errors as well as reducing the resources and time required for performing one or more NLG tasks (e.g., automatically annotating unlabeled data).

FIG. 1 is a diagram illustrating an example workflow for implementing active learning in an NLG task, according to an example embodiment of the invention. By way of illustration, FIG. 1 depicts unlabeled data instances 102 being processed by artificial intelligence-based generation model (M) 104 to generate the unlabeled data with model outputs 106. The unlabeled data with model outputs 106 are then processed using quality metric (Q) 108, which generates the unlabeled data with quality scores of the corresponding model outputs 110. Further, as depicted in FIG. 1, one or more embodiments include selecting one or more examples of the unlabeled data and corresponding model output(s) based at least in part on the quality scores (e.g., selecting examples with the lowest quality scores).

Figure 2:
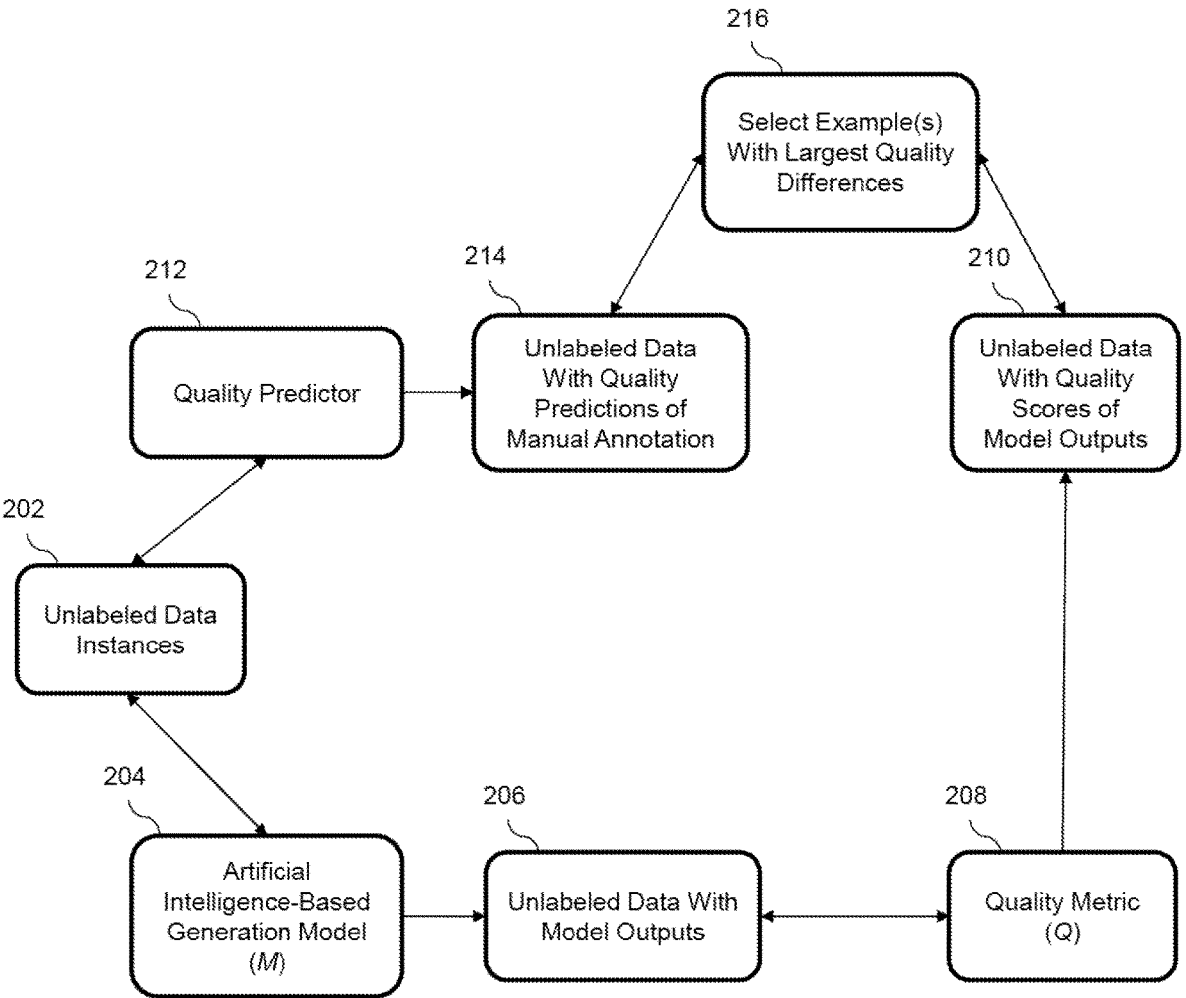
FIG. 2 is a diagram illustrating an example workflow for implementing active learning in an NLG task, according to an example embodiment of the invention.

FIG. 2 is a diagram illustrating an example workflow for implementing active learning in an NLG task, according to an example embodiment of the invention. By way of illustration, FIG. 2 depicts unlabeled data instances 202 being processed by artificial intelligence-based generation model (M) 204 to generate the unlabeled data with model outputs 206. The unlabeled data with model outputs 206 are then processed using quality metric (Q) 208, which generates the unlabeled data with quality scores of the corresponding model outputs 210. Additionally, the unlabeled data instances 202 are also processed by quality predictor 212 to generate the unlabeled data with quality predictions of manual annotation 214. Further, as depicted in FIG. 2, step 216 includes selecting one or more examples of the unlabeled data with the largest difference(s) between quality prediction of manual annotation and quality score of model output(s).

With respect to comparing and/or analyzing the quality of model-generated text versus the quality of human annotation (such as carried out in step 216), consider an example annotation generation task. In an example embodiment such as depicted in FIG. 2, quality metric (Q) 208 can include, by way merely of example, an average of sematic similarity and lexical diversity.

Additionally, at least one embodiment includes training the quality predictor 212. For example, given an input text x, and a human annotation y, to estimate the expected quality of a manual annotation of x, such an embodiment includes training a quality regression model (QP) such that given x, QP predicts the expected quality of its manual annotation. Specifically, QP can be trained using a set of labeled data $L=\{(x\_i, y\_i)\}$, wherein the data being regressed is $L'=\{x\_i, Q(x\_i, y\_i)\}$. At least one example embodiment can then include selecting the examples of the labeled data L with highest $QP(x)-Q(x, x')$.

One or more embodiments also include determining and/or selecting the quality metric (Q). In choosing between different possible metrics $\{Q_i\}$, such a selection can be made based at least in part on the highest potential advantage over a random strategy. Accordingly, at least one example embodiment can include defining the average predicted quality gain $(A_Q)$ from annotating a given dataset(S) in accordance with the following equation:

$$A_Q(S) = E_{x \in S}(QP(x) - Q(x, x'))$$

Such an embodiment can include computing the distribution of $A_Q(S)$ over a random selection of S of a given size (n) from the unlabeled population, wherein E represents and estimation for the unlabeled population. For each $Q_i$, such an embodiment also includes computing $A_{Qi}(S_{Qi})$ for the n examples, wherein $S_{Qi}$ is selected based at least in part on $Q_i$. $Q_i$, for which $A_{Qi}(S_{Qi})$ has the highest z-score, can be selected with respect to the distribution of $A_Q(S)$ over random selections.

FIG. 3 is a flow diagram illustrating techniques according to an embodiment of the present invention. Step 302 includes generating multiple natural language annotations associated with multiple items of unlabeled data by processing the unlabeled data using at least one artificial intelligence model. In at least one embodiment, processing the unlabeled data includes processing the unlabeled data using at least one artificial intelligence-based natural language generation model. In such an embodiment, the at least one artificial intelligence-based natural language generation model can include at least one transformer-based generative model (e.g., one or more encoder-decoder models and/or one or more denoising autoencoders).

Additionally, in at least one embodiment, generating the multiple natural language annotations includes processing the unlabeled data using at least one artificial intelligence model in accordance with one or more predetermined characteristics of a given NLG task.

Step 304 includes determining at least one quality score attributed to at least a portion of the multiple generated natural language annotations based at least in part on at least one quality metric. In one or more embodiments, determining at least one quality score includes determining the at least one quality score attributed to the at least a portion of the multiple generated natural language annotations based at least in part on one or more reference-less evaluation metrics.

Step 306 includes selecting at least one of the multiple natural language annotations and at least one corresponding item of the multiple items of unlabeled data based at least in part on the at least one determined quality score. In at least one embodiment, selecting at least one of the multiple natural language annotations includes selecting the at least one natural language annotation which corresponds with improvement associated with the at least one artificial intelligence model, as measured by the at least one quality metric.

Step 308 includes performing one or more automated actions based at least in part on the at least one selected natural language annotation. In one or more embodiments, performing one or more automated actions includes automatically training the at least one artificial intelligence model using the least one selected natural language annotation and the at least one corresponding item of unlabeled data. Additionally or alternatively, performing one or more automated actions can include automatically training one or more artificial intelligence models to be used in connection with one or more NLG tasks using the least one selected natural language annotation and the at least one corresponding item of unlabeled data.

The techniques depicted in FIG. 3 can also include generating one or more predictions of quality of one or more potential manual annotations associated with multiple items of unlabeled data. In such an embodiment, selecting at least one of the multiple natural language annotations and at least one corresponding item of the multiple items of unlabeled data includes selecting at least one of the multiple natural language annotations and at least one corresponding item of the multiple items of unlabeled data based at least in part on at least one difference between the at least one determined quality score and the one or more generated predictions of quality of the one or more potential manual annotations.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on language data and/or quality metric data, and such recommendations and/or predictions can be used to initiate one or more automated actions (e.g., automatically training one or more artificial intelligence models, automatically initiating one or more NLG tasks, etc.).

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor.

Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system.

Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as improved NLG task performance code 426. In addition to improved NLG task performance code 426, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and code 426, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code 426 in persistent storage 413.

Communication fabric 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type RAM or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a ROM, but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in code 426 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

In computing environment 400, computer 401 is shown as being connected to the internet (see WAN 402). However, in many embodiments of the present invention computer 401 will be isolated from communicating over communications network and not connected to the internet, running as a standalone computer. In these embodiments, network module 415 of computer 401 may not be necessary or even desirable in order to ensure isolation and to prevent external communications coming into computer 401. The standalone computer embodiments are potentially advantageous, at least in some applications of the present invention, because they are typically more secure. In other embodiments, computer 401 is connected to a secure WAN or a secure LAN instead of WAN 402 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory configured to store program instructions; and
a processor operatively coupled to the memory to execute the program instructions to:
    generate multiple natural language annotations associated with multiple items of unlabeled data by processing the unlabeled data using at least one artificial intelligence model;
    determine at least one quality score attributed to at least a portion of the multiple generated natural language annotations based at least in part on at least one quality metric;
    select at least one of the multiple natural language annotations and at least one corresponding item of the multiple items of unlabeled data based at least in part on the at least one determined quality score, wherein selecting at least one of the multiple natural language annotations and at least one corresponding item of the multiple items of unlabeled data comprises selecting the at least one of the multiple natural language annotations and the at least one corresponding item of the multiple items of unlabeled data based at least in part on at least one difference between the at least one determined quality score and one or more predicted quality scores pertaining to one or more manual annotations associated with the multiple items of unlabeled data; and
    perform one or more automated actions based at least in part on the at least one selected natural language annotation, wherein performing one or more automated actions comprises automatically training, using the least one selected natural language annotation and the at least one corresponding item of unlabeled data, the at least one artificial intelligence model to be used in connection with one or more natural language generation (NLG) tasks.

2. The system of claim 1, wherein performing one or more automated actions comprises automatically training one or more additional artificial intelligence models to be used in connection with one or more NLG tasks using the least one selected natural language annotation and the at least one corresponding item of unlabeled data.

3. The system of claim 1, wherein processing the unlabeled data comprises processing the unlabeled data using at least one artificial intelligence-based natural language generation model.

4. The system of claim 3, wherein the at least one artificial intelligence-based natural language generation model comprises at least one transformer-based generative model.

5. The system of claim 4, wherein the at least one transformer-based generative model comprises at least one of one or more encoder-decoder models and one or more denoising autoencoders.

6. The system of claim 1, wherein generating the multiple natural language annotations comprises processing the unlabeled data using at least one artificial intelligence model in accordance with one or more predetermined characteristics of a given NLG task.

7. The system of claim 1, wherein determining at least one quality score comprises determining the at least one quality score attributed to the at least a portion of the multiple generated natural language annotations based at least in part on one or more reference-less evaluation metrics.

8. The system of claim 1, wherein selecting at least one of the multiple natural language annotations comprises selecting the at least one natural language annotation which corresponds with improvement associated with the at least one artificial intelligence model, as measured by the at least one quality metric.

9. The system of claim 1, wherein the processor is further operatively coupled to the memory to execute the program instructions to:
    predict the one or more quality scores pertaining to the one or more manual annotations associated with the multiple items of unlabeled data.

10. A computer program product comprising a computer readable storage medium having program instructions embodied therewith, the program instructions executable by a computing device to cause the computing device to:
    generate multiple natural language annotations associated with multiple items of unlabeled data by processing the unlabeled data using at least one artificial intelligence model;
    determine at least one quality score attributed to at least a portion of the multiple generated natural language annotations based at least in part on at least one quality metric;
    select at least one of the multiple natural language annotations and at least one corresponding item of the multiple items of unlabeled data based at least in part on the at least one determined quality score, wherein selecting at least one of the multiple natural language annotations and at least one corresponding item of the multiple items of unlabeled data comprises selecting the at least one of the multiple natural language annotations and the at least one corresponding item of the multiple items of unlabeled data based at least in part on at least one difference between the at least one determined quality score and one or more predicted quality scores pertaining to one or more manual annotations associated with the multiple items of unlabeled data; and perform one or more automated actions based at least in part on the at least one selected natural language annotation, wherein performing one or more automated actions comprises automatically training, using the least one selected natural language annotation and the at least one corresponding item of unlabeled data, the at least one artificial intelligence model to be used in connection with one or more natural language generation (NLG) tasks.

11. The computer program product of claim 10, wherein processing the unlabeled data comprises processing the unlabeled data using at least one artificial intelligence-based natural language generation model.

12. The computer program product of claim 10, wherein the program instructions executable by a computing device further cause the computing device to:

predict the one or more quality scores pertaining to the one or more manual annotations associated with the multiple items of unlabeled data.

13. A computer-implemented method comprising:

generating multiple natural language annotations associated with multiple items of unlabeled data by processing the unlabeled data using at least one artificial intelligence model;

determining at least one quality score attributed to at least a portion of the multiple generated natural language annotations based at least in part on at least one quality metric;

selecting at least one of the multiple natural language annotations and at least one corresponding item of the multiple items of unlabeled data based at least in part on the at least one determined quality score, wherein selecting at least one of the multiple natural language annotations and at least one corresponding item of the multiple items of unlabeled data comprises selecting the at least one of the multiple natural language annotations and the at least one corresponding item of the multiple items of unlabeled data based at least in part on at least one difference between the at least one determined quality score and one or more predicted quality scores pertaining to one or more manual annotations associated with the multiple items of unlabeled data; and performing one or more automated actions based at least in part on the at least one selected natural language annotation, wherein performing one or more automated actions comprises automatically training, using the least one selected natural language annotation and the at least one corresponding item of unlabeled data, the at least one artificial intelligence model to be used in connection with one or more natural language generation (NLG) tasks;

wherein the method is carried out by at least one computing device.

14. The computer-implemented method of claim 13, further comprising:

predicting the one or more quality scores pertaining to the one or more manual annotations associated with the multiple items of unlabeled data.

15. The computer-implemented method of claim 13, wherein software implementing the method is provided as a service in a cloud environment.

16. The computer-implemented method of claim 13, wherein processing the unlabeled data comprises processing the unlabeled data using at least one artificial intelligence-based natural language generation model.

17. The computer-implemented method of claim 13, wherein generating the multiple natural language annotations comprises processing the unlabeled data using at least one artificial intelligence model in accordance with one or more predetermined characteristics of a given NLG task.

18. The computer-implemented method of claim 13, wherein determining at least one quality score comprises determining the at least one quality score attributed to the at least a portion of the multiple generated natural language annotations based at least in part on one or more reference-less evaluation metrics.

19. The computer-implemented method of claim 13, wherein performing one or more automated actions comprises automatically training one or more additional artificial intelligence models to be used in connection with one or NLG tasks using the least one selected natural language annotation and the at least one corresponding item of unlabeled data.

20. The computer-implemented method of claim 13, wherein selecting at least one of the multiple natural language annotations comprises selecting the at least one natural language annotation which corresponds with improvement associated with the at least one artificial intelligence model, as measured by the at least one quality metric.

* * * * *